US011938551B2

(12) United States Patent
Bojanowski et al.

(10) Patent No.: US 11,938,551 B2
(45) Date of Patent: Mar. 26, 2024

(54) 3D PRINTED GEAR CUTTING TOOLS WITH CAPILLARIES FOR MINIMUM QUANTITY LUBRICATION, GAS OR LIQUID

(71) Applicant: Ford Global Technologies, LLC, Dearborn, MI (US)

(72) Inventors: Paul John Bojanowski, Macomb Township, MI (US); Russell Lee Weatherspoon, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 16/905,376

(22) Filed: Jun. 18, 2020

(65) Prior Publication Data
US 2021/0394285 A1 Dec. 23, 2021

(51) Int. Cl.
*B23C 5/28* (2006.01)
*B23Q 11/10* (2006.01)
*B33Y 80/00* (2015.01)

(52) U.S. Cl.
CPC ............ *B23C 5/28* (2013.01); *B23C 2250/12* (2013.01); *B23Q 11/103* (2013.01); *B33Y 80/00* (2014.12)

(58) Field of Classification Search
CPC ..... B23C 5/28; B23C 2250/12; B23Q 11/103; B23B 51/042; B23B 51/0486; B23B 51/06; B23B 51/066; B23B 51/063
See application file for complete search history.

(56) References Cited

U.S. PATENT DOCUMENTS

| | | | | |
|---|---|---|---|---|
| 594,330 A | * | 11/1897 | Cox, Jr. ............... | B23Q 1/0036 285/190 |
| 2,777,702 A | * | 1/1957 | Rodal .................... | B23Q 11/10 285/190 |
| 3,874,808 A | * | 4/1975 | Zaccardelli ............ | B23Q 11/10 408/1 R |

(Continued)

FOREIGN PATENT DOCUMENTS

| | | | |
|---|---|---|---|
| DE | 4416380 A1 | * 11/1995 | ............. B23C 5/006 |
| DE | 10145006 | 4/2003 | |

(Continued)

OTHER PUBLICATIONS

Description JP06047647A (translation) obtained at https://dialog.proquest.com/professional/cv_2183530/lookuppatent?accountid=131444 (last visited Aug. 26, 2022).*

(Continued)

*Primary Examiner* — Ryan Rufo
(74) *Attorney, Agent, or Firm* — Burris Law, PLLC

(57) ABSTRACT

A gear forming tool includes an outer sleeve having an outer sleeve aperture and an inner sleeve having an inner sleeve aperture in fluid communication with the outer sleeve aperture, a tool holder disposed within the outer sleeve, and a 3D printed gear cutting tool with a plurality of tool cutting edges and a plurality of capillaries attached to the tool holder. The tool holder has a plurality of fluid channels configured to be in fluid communication with the inner sleeve aperture and the plurality of capillaries of the 3D printed gear cutting tool such that cutting fluid flows through the outer sleeve, the inner sleeve, the plurality of fluid channels of the tool holder, and the plurality of capillaries to the plurality of tool cutting edges.

13 Claims, 6 Drawing Sheets

(56) References Cited

U.S. PATENT DOCUMENTS

| | | | | |
|---|---|---|---|---|
| 4,293,251 | A * | 10/1981 | Anderson | F16L 41/12 |
| | | | | 285/190 |
| 4,570,952 | A * | 2/1986 | Heimbigner | B23Q 1/0036 |
| | | | | 279/20 |
| 4,573,836 | A * | 3/1986 | Andersson | B23Q 1/0036 |
| | | | | 408/59 |
| 4,652,189 | A * | 3/1987 | Mizoguchi | B23Q 11/1023 |
| | | | | 408/239 R |
| 4,890,963 | A * | 1/1990 | Keritsis | F16L 27/087 |
| | | | | 285/190 |
| 5,290,135 | A * | 3/1994 | Ball | B23Q 11/10 |
| | | | | 407/11 |
| 8,946,585 | B2 | 2/2015 | Kappmeyer | |
| 9,573,234 | B2 | 2/2017 | Liepelt et al. | |
| 9,808,898 | B2 * | 11/2017 | Laporte | B23Q 11/103 |
| 10,058,965 | B2 * | 8/2018 | Haimer | B23C 5/28 |
| 10,710,173 | B2 * | 7/2020 | Ericson | B23C 5/08 |
| 11,691,206 | B2 * | 7/2023 | Sterling | B23B 51/06 |
| | | | | 408/57 |
| 2003/0152431 | A1 * | 8/2003 | Jansen | B23Q 37/00 |
| | | | | 408/56 |
| 2012/0298214 | A1 * | 11/2012 | Gregory | B23Q 1/0036 |
| | | | | 137/315.01 |
| 2015/0050093 | A1 * | 2/2015 | DeLand | B23Q 11/006 |
| | | | | 408/1 R |
| 2017/0216939 | A1 | 8/2017 | Koik et al. | |
| 2017/0252839 | A1 | 9/2017 | Donisi et al. | |
| 2021/0220956 | A1 * | 7/2021 | Fang | B23C 5/109 |
| 2022/0234125 | A1 * | 7/2022 | Sheen | B23C 5/28 |

FOREIGN PATENT DOCUMENTS

| | | | | |
|---|---|---|---|---|
| DE | 102017112374 | | 12/2018 | |
| JP | 06047647 A | * | 2/1994 | |
| WO | WO-2018162185 A1 | * | 9/2018 | B23B 51/06 |

OTHER PUBLICATIONS

Smith, Cutting Tool Innovation—From Dry Hobbing to Super Skiving, Gearsolutions.com, Mar. 24, 2017, pp. 1-13.

* cited by examiner

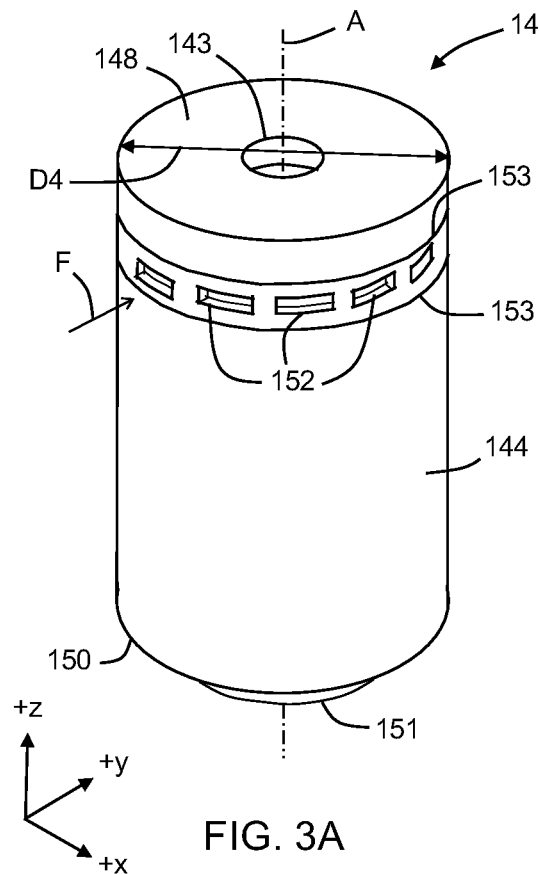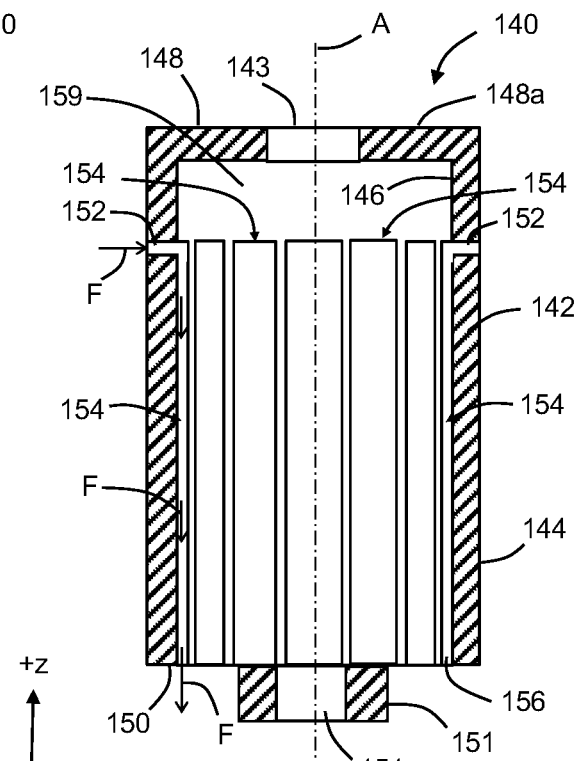
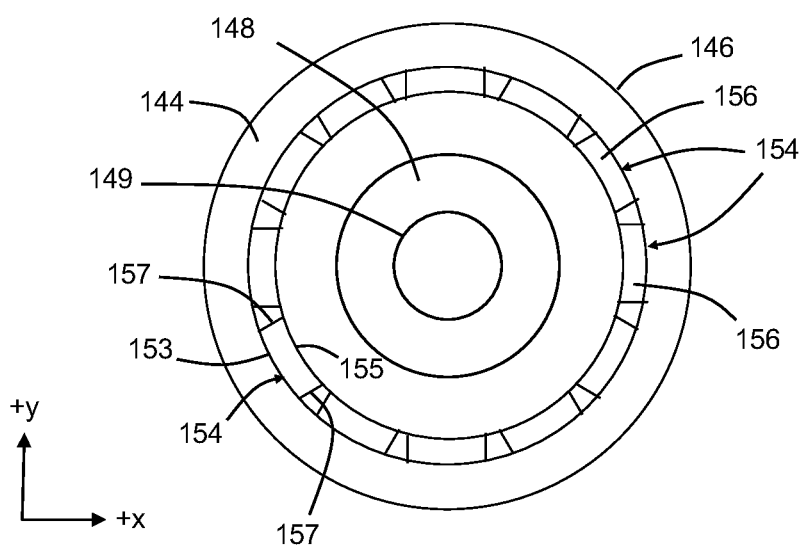

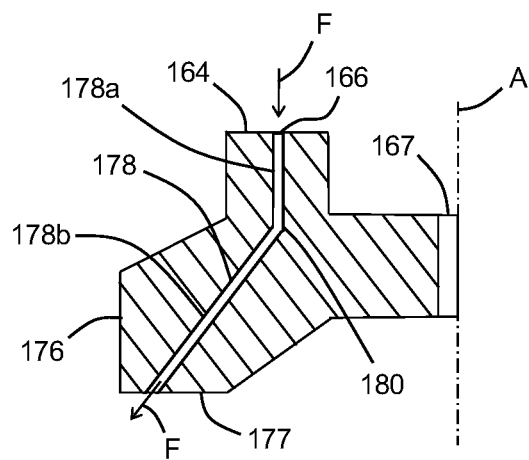
FIG. 5A
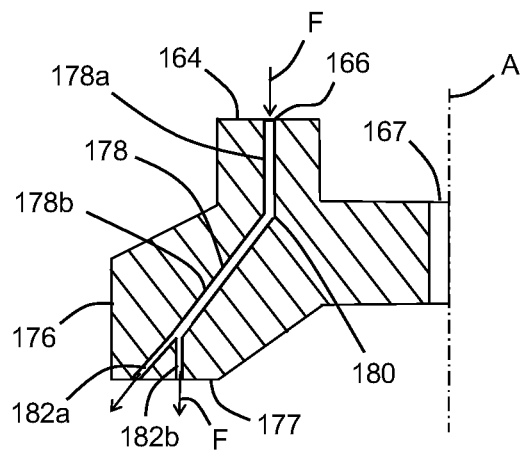
FIG. 5B
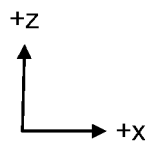
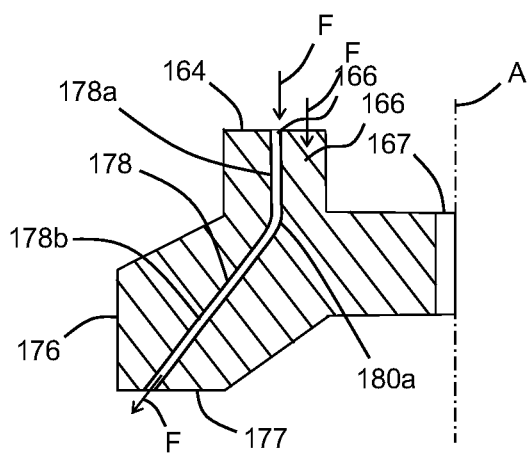
FIG. 5C
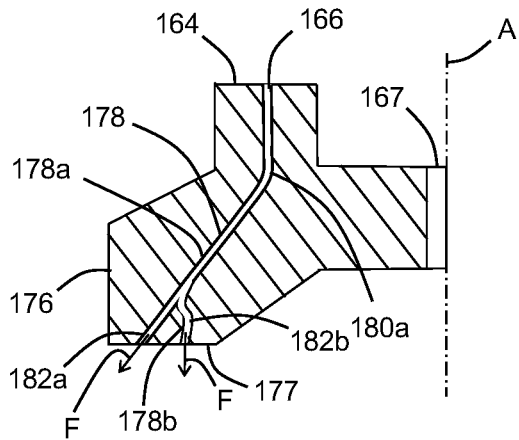
FIG. 5D … # 3D PRINTED GEAR CUTTING TOOLS WITH CAPILLARIES FOR MINIMUM QUANTITY LUBRICATION, GAS OR LIQUID

FIELD

The present disclosure relates to gear cutting tools and particularly to gear cutting tools using minimum quantity lubrication, gas or liquid.

BACKGROUND

The statements in this section merely provide background information related to the present disclosure and may not constitute prior art.

Helical gears, splines, or other gear shapes are manufactured using methods such as broaching, hobbing, skiving, shaping, milling, among others, and one desired type of tooling for these methods uses minimum quantity lubrication (MQL), gaseous lubrication or liquid lubrication where minute amounts of lubricant liquid suspended in gas (i.e., MQL), gaseous lubricant or liquid lubricant are applied directly to the tool/work piece interface. However, using gear cutting tools with MQL, gas or liquid typically includes the use of costly external hardware. Also, design and manufacture of a given gear cutting tool with MQL, gas or liquid capability can take weeks or even months, all of which must occur before testing of the gear cutting tool can begin.

These challenges with the manufacture and use of gear cutting tools with MQL, gas or liquid capability are addressed by the present disclosure.

SUMMARY

In one form of the present disclosure, a gear forming tool includes an outer sleeve having an outer sleeve aperture and an inner sleeve having an inner sleeve aperture configured to be in fluid communication with the outer sleeve aperture, and a tool holder configured to be disposed within the outer sleeve. The tool holder has a plurality of fluid channels configured to be in fluid communication with the inner sleeve aperture. Also, the gear forming tool includes a 3D printed gear cutting tool with a plurality of tool cutting edges and a plurality of capillaries. The plurality of fluid channels of the tool holder are configured to be in fluid communication with the plurality of capillaries of the 3D printed gear cutting tool such that cutting fluid flows through the outer sleeve, the inner sleeve, the plurality of fluid channels of the tool holder, and the plurality of capillaries to the plurality of tool cutting edges.

In some variations, the plurality of capillaries are non-linear capillaries. For example, in at least one variation, the plurality of capillaries are arcuate capillaries.

In some variations, the outer sleeve is stationary relative to the 3D printed gear cutting tool that is configured to rotate and form a gear from a workpiece.

In at least one variation, the plurality of fluid channels comprises a plurality of fluid inlets and a plurality of fluid outlets, and each of the plurality of fluid outlets is in fluid communication with at least one of the plurality of capillaries. In such variations, each of the plurality of fluid outlets can be in fluid communication with a different subset of the plurality of capillaries. Also, at least one of the plurality of fluid inlets can be a slot-shaped fluid inlet with a circumferential dimension greater than a height dimension. In some variations, at least one of the plurality of fluid outlets is a slot-shaped fluid outlet with a circumferential dimension greater than a radial dimension. In at least one variation, the plurality of capillaries extend from a plurality of capillary inlets at an upper end of the gear cutting tool to a plurality of capillary outlets at a lower surface of the gear cutting tool. In some variations, the plurality of capillary outlets are positioned proximate to the plurality of tool cutting edges.

In at least one variation, the inner sleeve is configured to be locked and held stationary with the outer sleeve such that the tool holder and the gear cutting tool rotate relative to the inner sleeve. In such variations, the tool holder can be configured to rotate relative to the inner sleeve such that the plurality of fluid inlets rotate into and out of fluid communication with the inner sleeve aperture.

In some variations, the inner sleeve is a bearing sleeve disposed between the outer sleeve and the tool holder.

In another form of the present disclosure, a gear forming tool includes an outer sleeve and an inner sleeve disposed within the outer sleeve. The outer sleeve has an outer sleeve aperture and the inner sleeve has an inner sleeve aperture in fluid communication with the outer sleeve aperture. The gear forming tool includes a tool holder disposed within the inner sleeve and tool holder has a plurality of channels extending between a plurality of slot-shaped fluid inlets and a plurality of slot-shaped fluid outlets. In some variations, the tool holder is configured to rotate within the inner sleeve such that the plurality of slot-shaped fluid inlets rotate into and out of fluid communication with the inner sleeve aperture. A 3D printed gear cutting tool is included as part of the gear forming tool and has a plurality of tool cutting edges and a plurality of non-linear capillaries extending between a plurality of capillary inlets in fluid communication with the plurality of fluid outlets and a plurality of capillary outlets positioned proximate to the plurality of tool cutting edges.

In some variations, the inner sleeve is configured to be locked and held stationary with the outer sleeve such that the tool holder and the gear cutting tool rotate relative to the inner sleeve, and the plurality of slot-shaped fluid inlets, the plurality of slot-shaped fluid outlets, and the plurality of non-linear capillaries are configured to rotate into and out of fluid communication with the outer sleeve aperture and the inner sleeve aperture. In such variations, each of the plurality of slot-shaped fluid outlets can be in fluid communication with a different subset of the plurality of non-linear capillaries.

In still another form of the present disclosure, a method of forming a gear includes moving a gear forming tool and a workpiece into contact with each other. The gear forming tool includes an outer fixed sleeve and an inner sleeve disposed within the outer sleeve, and the outer fixed sleeve has an outer sleeve aperture and the inner sleeve has an inner sleeve aperture in fluid communication with the outer sleeve aperture. Also, a tool holder is disposed within the inner sleeve and has a plurality of fluid channels extending between a plurality of slot-shaped fluid inlets and a plurality of slot-shaped fluid outlets. The tool holder is configured to rotate within the inner sleeve such that the plurality of slot-shaped fluid inlets rotate into and out of fluid communication with the inner sleeve aperture. A 3D printed gear cutting tool is included and has a plurality of tool cutting edges and a plurality of non-linear capillaries extending between a plurality of capillary inlets in fluid communication with the plurality of fluid outlets and a plurality of capillary outlets positioned proximate to the plurality of tool cutting edges. The method includes rotating the tool holder and the 3D printed gear cutting tool in a first direction while the outer fixed sleeve and the inner sleeve are held stationary relative to the tool holder and the 3D printed gear cutting tool and rotating the workpiece in a second direction. Also, the method includes flowing MQL, gas or liquid through the outer sleeve aperture, the inner sleeve aperture, the plurality of fluid channels, and the plurality of non-linear capillaries as the tool holder rotates within the inner sleeve and the plurality of slot-shaped fluid inlets rotate into and out of fluid communication with the inner sleeve aperture, and machining the workpiece and forming the gear. In some variations, each of the plurality of slot-shaped fluid outlets is in fluid communication with a different subset of the plurality of non-linear capillaries.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3A is a perspective view of the tool holder in FIG. 2;

FIG. 3B is side cross-sectional view of the tool holder in FIG. 3A;

FIG. 3C is bottom view of the tool holder in FIG. 3A;

FIG. 5A is a cross-sectional view of section 5-5 in FIG. 4A according to one variation of the present disclosure;

FIG. 5B is a cross-sectional view of section 5-5 in FIG. 4A according to another variation of the present disclosure;

FIG. 5C is a cross-sectional view of section 5-5 in FIG. 4A according to yet another variation of the present disclosure;

FIG. 5D is a cross-sectional view of section 5-5 in FIG. 4A according to still yet another variation of the present disclosure.

Figure 1:
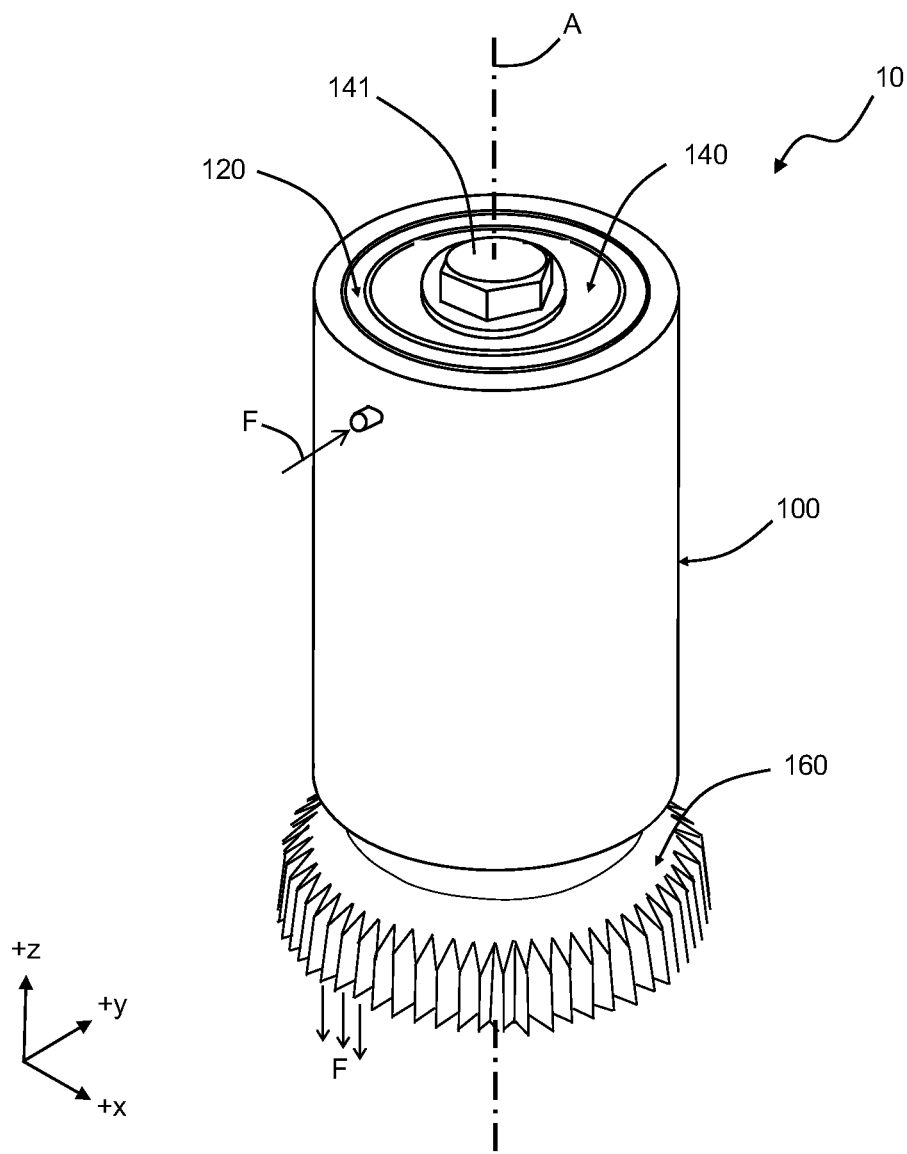
FIG. 1 is a perspective view of a gear forming tool according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an innovative gear forming tool that uses MQL, gas or liquid. The gear forming tool can use fluid supply systems from traditional machining equipment and can include a 3D printed gear cutting tool with capillary channels that receive MQL, gas or liquid flowing through a tool holder such that a subset of gear cutting edges in contact with a workpiece at any given time during a gear forming operation are lubricated.

Figure 2:
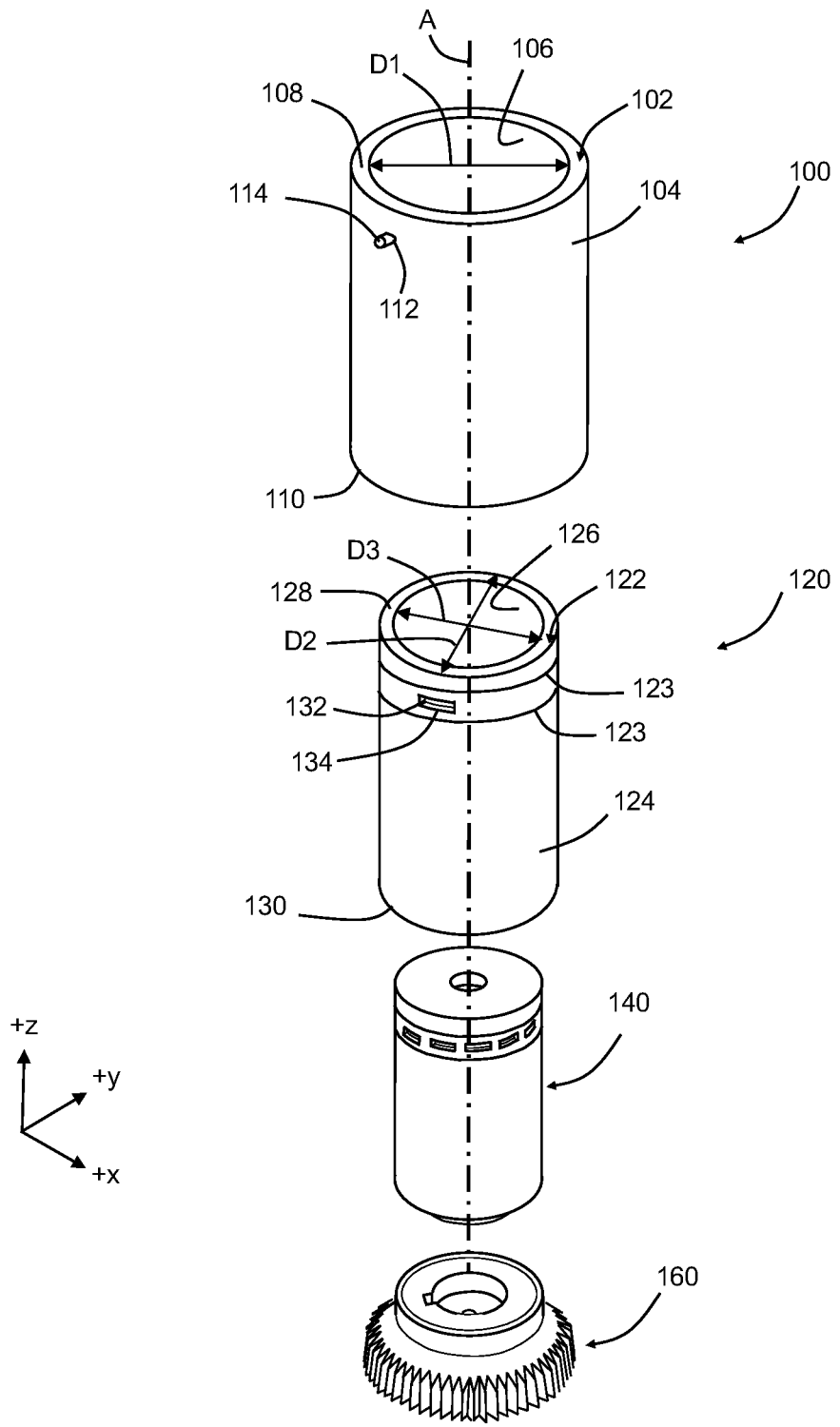
FIG. 2 is an exploded view of the gear forming tool in FIG. 1 showing an outer sleeve, an inner sleeve, a tool holder, and a gear cutting tool.

Referring to FIGS. 1 and 2, a gear forming tool 10 includes an outer sleeve 100, an inner sleeve 120, a tool holder 140 and a gear cutting tool 160. In the example provided, the gear forming tool 10 is configured to skive gear teeth. A fastener 141 (e.g., a threaded fastener such as a bolt) is used to attached the outer sleeve 100, the inner sleeve 120, the tool holder 140 and the gear cutting tool 160 to each other as shown in FIG. 1. As assembled and shown in FIG. 1, the gear forming tool 10 is employed or used in a gear forming machine (e.g., a CNC skiving or milling machine, not shown) such that the gear cutting tool 160 rotates about a central axis 'A' while moving axially relative to a workpiece (not shown) to form a gear from the workpiece as fluid 'F' flows into and out of the gear forming tool 10 as described in greater detail below. The fluid 'F' is a lubricant such as a gas, a liquid, or a combination of gas and liquid (e.g., MQL).

Referring specifically to FIG. 2, the outer sleeve 100 has a wall 102 that defines an outer surface 104, an inner surface 106, a first end 108 and a second end 110. Accordingly, the wall 102 has a thickness and extends between the outer surface 104 and the inner surface 106, and extends from the first end 108 to the second end 110. The inner surface 106 defines an inner diameter D1 and an outer sleeve aperture 112 extends through the wall 102 from the outer surface 104 to the inner surface 106. Also, an adaptor fitting 114 attached to the wall 102 and in fluid communication with the outer sleeve aperture 112 can be included. That is, the adaptor fitting 114 has an aperture (not labeled) such that fluid F received from a fluid supply system (not shown) can flow through the adaptor fitting 114 and the wall 102 of the outer sleeve 100.

Similar to the outer sleeve 100, the inner sleeve 120 has a wall 122 that defines an outer surface 124, an inner surface 126, a first end 128 and a second end 130. Accordingly, the wall 122 has a thickness and extends between the outer surface 124 and the inner surface 126, and extends from the first end 128 to the second end 130. The outer surface 124 defines an outer diameter D2 and the inner surface 126 defines an inner diameter D3. The outer diameter D2 is less than the inner diameter D1 such that the inner sleeve 120 can be disposed within the outer sleeve 100 with a desired clearance such that the inner sleeve 120 can rotate relative to the outer sleeve 100. In some variations, the desired clearance is between 0.005 inches and 0.025 inches per inch (in/in) of outer diameter D2. In at least one variation, the desired clearance is between 0.010 and 0.020 in/in of outer diameter D2. In one variation, the desired clearance is 0.015 in/in of outer diameter D2 (e.g., if D2 equals 3.0 inches, the desired clearance is 0.045 inches). In the alternative, the inner sleeve 120 can be disposed within the outer sleeve 100 with an interference fit or with a catch or latch (not shown) between the inner sleeve 120 and the outer sleeve 100 such that the inner sleeve 120 cannot rotate relative to the outer sleeve 100.

An inner sleeve aperture 132 extends through the wall 122 from the outer surface 124 to the inner surface 126. In some variations the inner sleeve includes a seal 123 (e.g., a pair of O-rings 123) such that fluid F flowing through the adapter fitting 114 of the outer sleeve 100 and into the inner sleeve aperture 132 is contained by the seal 123 (e.g., between the pair of O-rings 123). Also, an inner fitting 134 can be included and be in fluid communication with the inner sleeve aperture 132 and/or an interior (not labeled) of the inner sleeve 120. That is, the inner fitting 134 has an aperture (not labeled) such that fluid F flows through the inner fitting 134 and the wall 122 of the inner sleeve 120. As shown in FIG. 2, the inner sleeve aperture 132 has a slot shape with a circumferential dimension greater than a height (z-direction) dimension. However, it should be understood that the inner sleeve aperture 132 can have different shapes such as circular, square, elliptical, among others.

Referring to FIGS. 3A-3B, the tool holder 140 has a wall 142 defining an outer surface 144, an inner surface 146, a first end 148 and a second end 150. Accordingly, the wall 142 has a thickness and extends between the outer surface 144 and the inner surface 146, and extends from the first end 148 to the second end 150. The outer surface 144 defines an outer diameter D4 that is less than the inner diameter D3 such that the tool holder 140 can be disposed within the inner sleeve 120 with a desired clearance such that the tool holder 140 can rotate relative to the inner sleeve 120. In some variations the desired clearance is between 0.005 inches and 0.025 in/in of outer diameter D4. In at least one variation, the desired clearance is between 0.010 and 0.020 in/in of outer diameter D4. In one variation, the desired clearance is 0.150 in/in of outer diameter D2 (e.g., if D2 equals 3.0 inches, the desired clearance is 0.045 inches). In the alternative, the tool holder 140 can be disposed within the inner sleeve 120 with an interference fit or with a catch, lock or latch (not shown) between the tool holder 140 and the inner sleeve 120 such that tool holder 140 cannot rotate relative to the inner sleeve 120. In some variations, the first end 148 includes an upper flange 148a with an aperture 143 as shown in FIGS. 3A-3B and a collar 151 with an aperture 151a extends from the second end 150. In at least one variation, the aperture 143 is coaxial with the aperture 149.

The outer surface 144 includes a plurality of fluid inlets 152 in fluid communication with a plurality of fluid channels 154 positioned in an interior space 159 of the tool holder 140. In some variations, each of the plurality of fluid channels 154 is defined by an outer surface 153, an inner surface 155, and a pair of side surfaces 157 (FIG. 3C). The plurality of fluid channels 154 extend along and/or within the inner surface 146 from the plurality of fluid inlets 152 to a plurality of fluid outlets 156. It should be understood that fluid F can flow into each of the plurality of fluid channels 154 via each of the plurality of fluid inlets 152, and exit each of the plurality of fluid channels 154 via each of the plurality of fluid outlets 156. As shown in FIGS. 3A and 3C, in some variations the plurality of fluid inlets 152 have a circumferential dimension greater than a height (z direction) dimension and/or the plurality of fluid outlets 156 have a circumferential dimension greater than a radial direction. That is, the plurality of fluid inlets 152 and/or the plurality of fluid outlets 156 are slot-shaped.

Figure 4A:
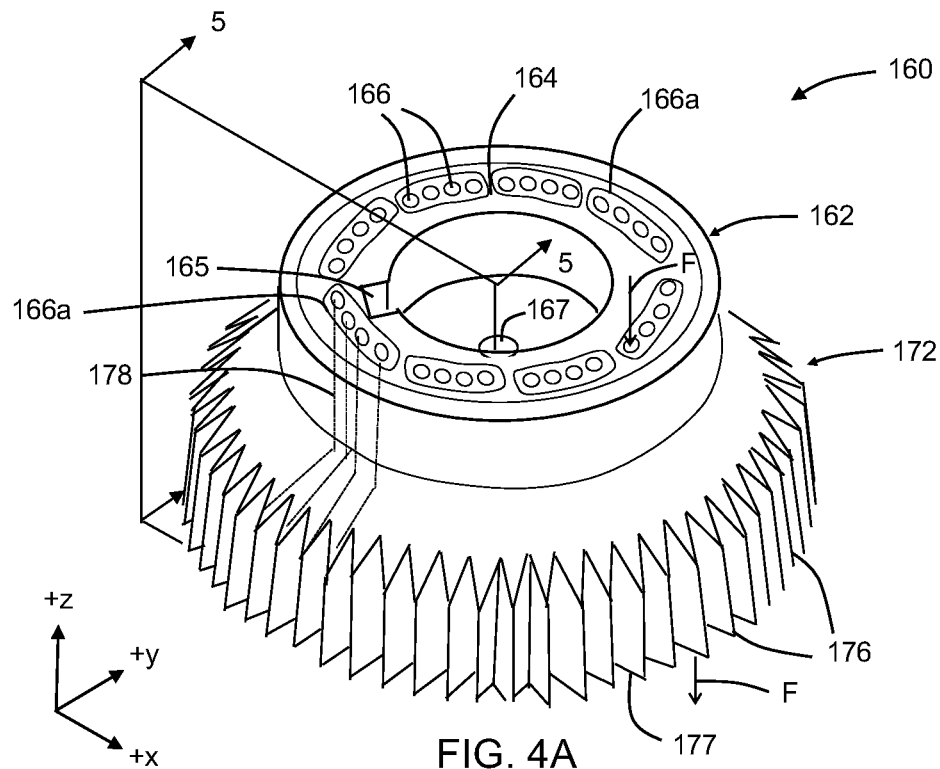
FIG. 4A is a perspective view of the gear cutting tool in FIG. 2.
Figure 4B:
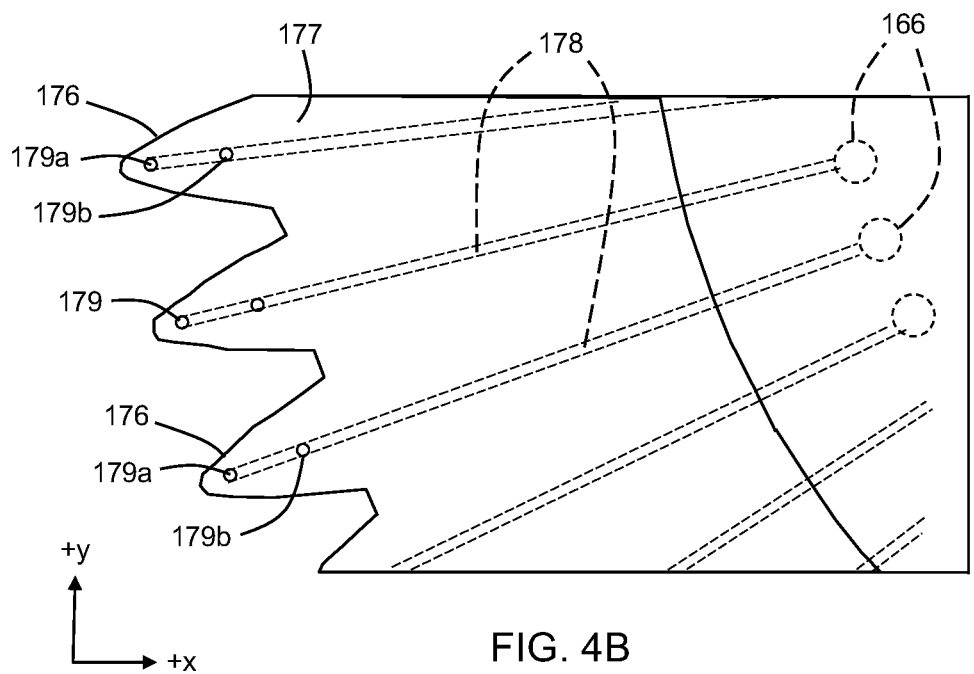
FIG. 4B is a bottom view of a section of the gear cutting tool in FIG. 4A.

Referring to FIGS. 4A-4B, the gear cutting tool 160 includes a head portion 162 and a cutting portion 172. In addition, an inset 165 and an aperture 167 extending axially (A-axis) through the gear cutting tool 160 is provided such that the gear cutting tool 160 can be attached or mounted to the tool holder 140 (e.g., using the fastener 141) in a desired position or orientation. The head portion 162 has an upper (+z direction) end 164 configured to align with and be in fluid communication with the plurality of fluid channels 154 of the tool holder 140, and the cutting portion has a plurality of cutting edges 176 (also known as cutting teeth) configured to form or machine (e.g., skive) a gear (not shown). In some variations, the gear cutting tool 160 is formed by additive manufacturing. For example, the gear cutting tool 160 is a 3D printed gear cutting tool 160 formed by a powder bed fusion process such as direct metal laser sintering (DMLS), electron beam melting (EBM), selective heat sintering (SHS), selective laser melting (SLM) or selective laser sintering (SLS). In addition, the gear cutting tool 160 can be formed from any metal or alloy suitable for machining of gears such as but not limited to, iron alloys, nickel alloys, among others.

The gear cutting tool 160 includes a plurality of capillaries 178 extending from the upper end 164 of the head portion 162 to a lower (−z direction) surface 177 of the plurality of cutting edges 176. Each of the plurality of capillaries 178 has a capillary inlet 166 at the upper end 164 and at least one capillary outlet 179 (e.g., one, two, three, or more capillary outlets) at the lower surface 177. In some variations, each of the plurality of capillaries 178 has a capillary inlet 166 and two capillary outlets 179a, 179b (FIG. 4B). In such variations, one of the capillary outlets 179 (e.g., capillary outlet 179a) can be positioned at the lower surface 177 to deliver fluid F to a cutting edge 176 for lubrication and the other capillary outlet 179 (e.g., capillary outlet 179b) can be positioned at the lower surface 177 to deliver fluid F and remove machined chips (not shown) at or near the plurality of cutting edges 176 during a gear forming operation.

In at least one variation the plurality of capillaries 178 for a given or particular gear cutting tool 160 are specific to a desired mechanical timing of the plurality of cutting edges 176 coming into contact with and machining a workpiece (not shown). For example, the plurality of capillaries 178 can be grouped or divided into subsets of capillaries 178 such a predetermined number or set of cutting edges 176 are supplied with lubrication as the predetermined cutting edges 176 rotate and come into contact with the workpiece. In one example, subsets of four (4) capillaries 178 are grouped and located within recessed (−z direction) pockets 166a such that each subset of four capillaries 178 is coupled with a particular fluid channel 154 (via the fluid channel's fluid outlet 156). Accordingly, the tool holder 140 and gear cutting tool 160 can be configured for lubrication to flow to a predetermined subset of cutting edges 176 as the subset of cutting edges 176 rotate and come into with the workpiece. Stated differently, a subset of capillaries can be coupled for mechanical timing based on a specific workpiece and tool tooth count in order to deliver lubrication to tool teeth (cutting edges) engaged in cutting the workpiece. Also, it should be understood that 3D printing of the tool holder 140 and/or gear cutting tool 160 provides for design, manufacture and testing of such tool holders 140 and/or gear cutting tools 160 with reduced cost and time.

Referring to FIGS. 5A-5D, four non-limiting examples of a capillary 178 in the gear cutting tool 160 are shown. For example, the capillary 178 shown in FIG. 5A includes an upper (+z direction) portion 178a extending from the upper end 164 towards the lower surface 177, a lower (−z direction) portion 178b extending from the upper portion 178a to the lower surface 177, and a sharp corner 180 between the upper portion 178a and the lower portion 178b. As used herein the phrase "sharp corner" refers to a corner formed by the intersection of two linear capillary portions such that the corner a single angle, i.e., not curved or arcuate.

In some variations, an inner dimension (e.g., inner diameter) of the upper portion 178a is generally equal to an inner dimension of the lower portion 178b, while in other variations an inner dimension of the upper portion 178a is not equal to an inner dimension of the lower portion 178b. For example, in some variations an average inner dimension of the lower portion 178b is generally uniform along the length of the lower portion 178b and is less than an average inner dimension of the upper portion 178a which is generally uniform along the length of upper portion 178a. In other variations, an inner dimension of the capillary 178 continuously changes along the length of the upper portion 178a and/or along the length of the lower portion 178b. It should be understood that the inner dimension of the upper portion 178a and/or lower portion 178b of the capillary 178 can change (vary) or remain constant along the length of the capillary 178 such that a desired pressure of the fluid F is provided at the at least one capillary outlet 179.

Regarding FIG. 5B, the capillary 178 includes an upper portion 178a extending from the upper end 164 towards the lower surface 177, a lower portion 178b extending from the upper portion 178a to the lower surface 177, and a sharp corner 180 between the upper portion 178a and the lower portion 178b. In addition, the lower portion 178b includes two linear branch capillaries 182a, 182b that have an upper end (not labeled) in fluid communication with the lower portion 178b and a lower end (not labeled) in fluid communication with the lower surface 177. Accordingly, one of the linear branch capillaries (e.g., linear branch capillary 182a) and a corresponding capillary outlet 179 (e.g., capillary outlet 179a) can be configured and positioned to deliver fluid to the cutting edge 176 for lubrication and the other linear branch capillary (e.g., linear branch capillary 182b) and another corresponding capillary outlet 179 (e.g., capillary outlet 179b) can be configured and positioned to remove machined chips at or near the cutting edge 176 during a gear forming operation.

Regarding FIG. 5C, and similar to the capillary 178 shown in FIG. 5A, the capillary 178 in FIG. 5C includes an upper portion 178a extending from the upper end 164 towards the lower surface 177 and a lower portion 178b extending from the upper portion 178a to the lower surface 177. However, unlike the capillary 178 shown in FIG. 5A, the capillary 178 in FIG. 5C has an arcuate corner 180a between the upper portion 178a and the lower portion 178b. It should be understood that the arcuate corner 180a cannot be produced with traditional manufacturing techniques such as drilling, EDM, among others, and is manufactured during the additive manufacturing of the gear cutting tool 160.

Regarding FIG. 5D, the capillary 178 includes an upper portion 178a extending from the upper end 164 towards the lower surface 177, a lower portion 178b extending from the upper portion 178a to the lower surface 177, and an arcuate corner 180a between the upper portion 178a and the lower portion 178b. In addition, the lower portion 178b includes a linear branch capillary 182a and an arcuate branch capillary 182b, each having an upper end (not labeled) in fluid communication with the lower portion 178b of the capillary 178 and a lower end (not labeled) in fluid communication with the lower surface 177. Accordingly, the linear branch capillary 182a and a corresponding capillary outlet 179 (e.g., capillary outlet 179a) can be configured and positioned to deliver fluid to the cutting edge 176 for lubrication and the arcuate branch capillary 182b and another corresponding capillary outlet 179 (e.g., capillary outlet 179b) can be configured and positioned to remove machined chips at or near the cutting edge 176 during a gear forming operation. It should be understood that similar to the manufacture of the arcuate corner 180a, the arcuate capillary 182b cannot be produced with traditional manufacturing techniques such as drilling, EDM, among others, and is manufactured during the additive manufacturing of the gear cutting tool 160.

It should also be understood that the capillaries 178 in the gear cutting tool 160 can have a range of sizes and/or shapes given that the gear cutting tool 160 is additive manufactured. That is, as the gear cutting tool 160 is being manufactured layer-by-layer using an additive manufacturing process, the path, size and/or shape of each of the capillaries is not limited as with traditional manufacturing techniques. For example, in some variations, an inner dimension (e.g., inner diameter) of the upper portion 178a is generally equal to an inner dimension of the lower portion 178b, while in other variations an inner dimension of the upper portion 178a is not equal to an inner dimension of the lower portion 178b. For example, in some variations an average inner dimension of the lower portion 178b is generally uniform along the length of the lower portion 178b and is less than an average inner dimension of the upper portion 178a which is generally uniform along the length of upper portion 178a. In other variations, an inner dimension of the capillary 178 continuously changes along the length of the upper portion 178a and/or along the length of the lower portion 178b. Accordingly, the inner dimension of the upper portion 178a and/or lower portion 178b of the capillary 178 can change (vary) or remain constant along the length of the capillary 178 such that a desired pressure of the fluid F is provided at the at least one capillary outlet 179.

Figure 6:
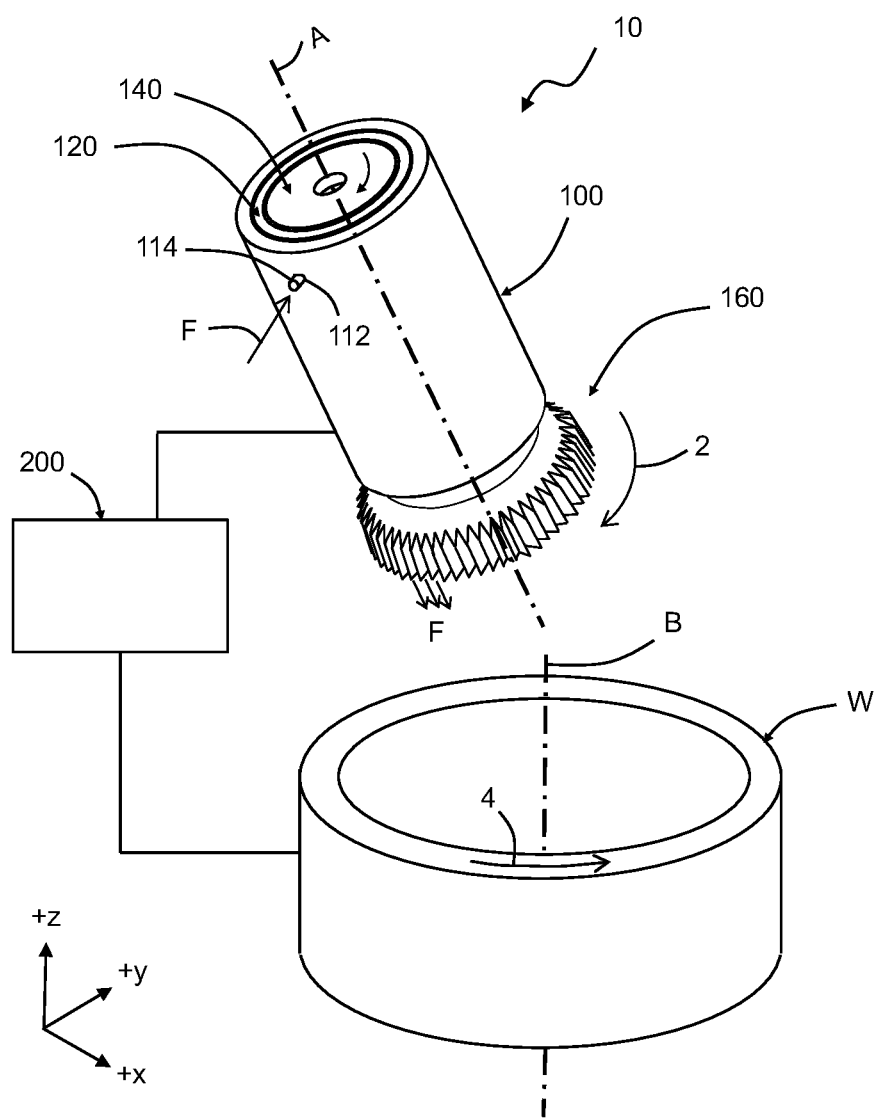
FIG. 6 is a perspective view of the gear forming tool in FIGS. 1-2 forming a gear from a workpiece.

Referring now to 6, the gear forming tool 10 preparing to form a gear from a workpiece 'W' is shown. During operation the gear forming tool 10 is rotated via a CNC machine 200 in a first direction 2 about the A axis and the workpiece W is rotated via the CNC machine 200 in a second direction 4 about the B axis. Fluid F flows into and through the adaptor fitting 114 (FIG. 6) and the outer sleeve 100, into and through the inner sleeve aperture 132 of the inner sleeve 120 (FIG. 2), and into the one or more of the fluid inlets 152 of the tool holder 140 (FIGS. 3A-3B).

From the one or more fluid inlets 152 (FIGS. 3A-3B) the fluid F flows through one or more corresponding fluid channels 154 (FIGS. 3A-3B) and exits the tool holder 140 (FIGS. 3A-3B) through one or more corresponding fluid outlets 156 (FIGS. 3A-3B). Each of the fluid outlets 156 (FIGS. 3A-3B) is in fluid communication with one or more corresponding capillary inlets 166 (FIGS. 4A-4B) of the gear cutting tool 160 such that fluid F flows into and through one or more corresponding capillary inlets 166 (FIGS. 4A-4B) and through one or more corresponding capillaries 178 (FIGS. 4A-4B) such that the fluid F exits the gear cutting tool 160 through one or more corresponding capillary outlets 179 (FIG. 4B). Accordingly, MQL, gas or fluid flows through the gear forming tool 10 as the workpiece W is formed into a gear (not shown).

In some variations, the outer sleeve 100 and the inner sleeve 120 are held fixed or stationary relative to the axis A while the tool holder 140 and the gear cutting tool 160 rotate about the axis A. In such variations, the tool holder 140 rotates within the inner sleeve 120, i.e., the inner sleeve 120 serves or is configured as a bearing sleeve. Also, the outer sleeve 100 is an outer fixed sleeve 100 and the adaptor fitting 114 and inner sleeve aperture 132 (FIG. 2) remain stationary as the fluid F flows through the adaptor fitting 114, the inner sleeve aperture 132 (FIG. 2) of the inner sleeve 120, and into each of the plurality of fluid inlets 152 (FIGS. 3A-3B) as the plurality of fluid inlets 152 (FIGS. 3A-3B) rotate into fluid communication with the inner sleeve aperture 132 (FIG. 2). Accordingly, the fluid F flows through each of the plurality of fluid channels 154 (FIG. 3B) and each of the plurality of capillaries 178 (FIGS. 4A-4B) such that the fluid F flows to and exits each of the plurality of capillary outlets 179 (FIG. 4B) as a corresponding cutting edge 176 (FIGS. 4A-4B) comes into contact with the workpiece W. In at least one variation, the adaptor fitting 114 and the inner sleeve aperture 132 (FIG. 2) of the inner sleeve 120 can be fixed or locked into a given position (e.g., a "12 o'clock position", a "3 o'clock position", a 6 o'clock position", among others) relative to the location of the workpiece W such that the location of cutting edges 176 (FIGS. 4A-4B) moving into contact with the workpiece W can be altered and yet still receive MQL, gas or liquid.

It should be understood that the fluid F can be delivered from a traditional or conventional lubrication source (not shown) such as a traditional flood lubricant source. That is, the gear forming tool 10 does not require a CNC machine 200 with an MQL through-spindle coolant delivery system, and yet flowing the fluid F through the outer fixed sleeve 100, inner sleeve 120, tool holder 140 and 3D gear cutting tool 160 as taught in the present disclosure provides MQL, gas or liquid during the forming of a gear from the workpiece W. It should also be understood that flowing the MQL, gas, or liquid through the at least one capillary 179 (FIGS. 4A-4B) provides improved evacuation of metal chips and shavings generated while cutting/machining the gear and thereby improves the gear profile and reduces the lead form error via not re-cutting previous chips and shavings that have not be removed or evacuated. It should also be understood that improving the gear profile and reducing the lead form error reduces and/or mitigates NVH-noise vibration and harshness in transmission gearing. Also, a 3D printed gear cutting tool with capillaries, e.g., a 3D printed skiving/shaper cutter with capillaries, can take less than one (1) week for manufacture, including heat treating and any finish processing that may be required. In contrast, a traditional broach bar design can take forty-two (42) weeks to manufacture from design to completion and traditionally manufactured skive/shaper cutter can take eight (8) weeks to manufacture from design to completion. Accordingly, 3D printed gear cutting tools of the present disclosure reduces the development and delivery timing versus traditional methods of making skive or shaper tools. In addition, the 3D printed cutting tools of the present disclosure allow design and manufacture of capillaries to the cutting edges that are not feasible with traditional manufacturing methods due to their paths, small diameters, and/or varying diameters. And the design and production of numerous 3D printed cutting tools provides faster process optimization and cost reductions in the manufacturing of the gears.

When an element or layer is referred to as being "on," "engaged to," "attached to," or "coupled to," another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Specially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A gear forming tool comprising:
   an outer sleeve having an outer sleeve aperture;
   an inner sleeve having an inner sleeve aperture disposed within the outer sleeve and in fluid communication with the outer sleeve aperture;
   a tool holder disposed within the inner sleeve and rotatable relative to the inner sleeve about a rotational axis of the tool holder, wherein the tool holder has a plurality of fluid channels, each fluid channel having a respective inlet open to an exterior of the tool holder and a respective outlet open to the exterior of the tool holder, each fluid channel extending independently of each other fluid channel through the tool holder from the respective inlet to the respective outlet of that fluid channel, wherein the inlets are spaced apart from each other in a circumferential direction about an exterior surface of the tool holder such that the inlets are configured to, sequentially, intermittently be in fluid communication with the inner sleeve aperture as the tool holder rotates relative to the inner sleeve, wherein the exterior surface extends between a first end surface and a second end surface, and the exterior surface is a continuous, uninterrupted cylindrical surface from the inlets to the second end surface, wherein the outlets are located in the second end surface, wherein each of the outer sleeve and the inner sleeve cover a majority of the exterior surface of the tool holder; and a gear cutting tool coupled to the tool holder for common rotation about the rotational axis, the gear cutting tool including a head portion and a cutting portion, wherein the head portion defines a plurality of capillary inlets open through an exterior end surface of the head portion, wherein the cutting portion has a plurality of tool cutting edges and a plurality of capillaries, each capillary extending to a corresponding one of the capillary inlets to receive fluid therefrom, wherein each outlet is in fluid communication with a corresponding subset of capillary inlets of the plurality of capillary inlets, each subset of capillary inlets includes at least two of the capillary inlets, wherein each subset of capillary inlets is independent of each other subset of capillary inlets by being grouped into respective recessed pockets in the exterior end surface of the head portion and each subset of capillary inlets, via the corresponding capillaries, are configured to provide lubrication to a corresponding subset of tool cutting edges of the plurality of tool cutting edges such that rotation of the tool holder relative to the inner sleeve, sequentially, intermittently provides lubrication to each subset of tool cutting edges, wherein each subset of tool cutting edges includes at least two of the tool cutting edges.

2. The gear forming tool according to claim 1, wherein the gear cutting tool is a 3D printed gear cutting tool.

3. The gear forming tool according to claim 1, wherein the plurality of capillaries are arcuate capillaries.

4. The gear forming tool according to claim 1, wherein the outer sleeve is stationary relative to the inner sleeve.

5. The gear forming tool according to claim 1, wherein at least one of the fluid inlets of the tool holder is a slot-shaped inlet.

6. The gear forming tool according to claim 5, wherein every slot-shaped inlet of the at least one of the inlets has a circumferential dimension, relative to the rotational axis, greater than a height dimension.

7. The gear forming tool according to claim 1, wherein at least one of the outlets is a slot-shaped outlet.

8. The gear forming tool according to claim 7, wherein every slot-shaped outlet of the at least one of the outlets has a circumferential dimension, relative to the rotational axis, greater than a radial dimension.

9. The gear forming tool according to claim 1, wherein each capillary of the plurality of capillaries extends from a corresponding one of a plurality of capillary inlets at an upper end of the gear cutting tool to at least one of a plurality of capillary outlets at a lower surface of the gear cutting tool.

10. The gear forming tool according to claim 9, wherein the plurality of capillary outlets are positioned proximate to the plurality of tool cutting edges.

11. The gear forming tool according to claim 10, wherein the inner sleeve is configured to be locked and held stationary with the outer sleeve such that the tool holder and the gear cutting tool rotate relative to the inner sleeve.

12. The gear forming tool according to claim 1, wherein the inner sleeve is a bearing sleeve disposed between the outer sleeve and the tool holder.

13. The gear forming tool according to claim 1, wherein the cutting edges extend radially outward relative to the rotational axis and each cutting edge is disposed on a corresponding tooth of a plurality of teeth that are arranged spaced apart in the circumferential direction about the rotational axis, wherein each tooth of the plurality of teeth has an axial end surface that faces in an axial direction of the rotational axis away from the head portion and each capillary extends to a capillary outlet on a corresponding one of the teeth.

\* \* \* \* \*